H. H. KING.
GRAIN CAR DOOR.
APPLICATION FILED JULY 19, 1912.

1,062,476.

Patented May 20, 1913.

2 SHEETS—SHEET 1.

Witnesses

Inventor
Henry H. King
By Victor J. Evans
Attorney

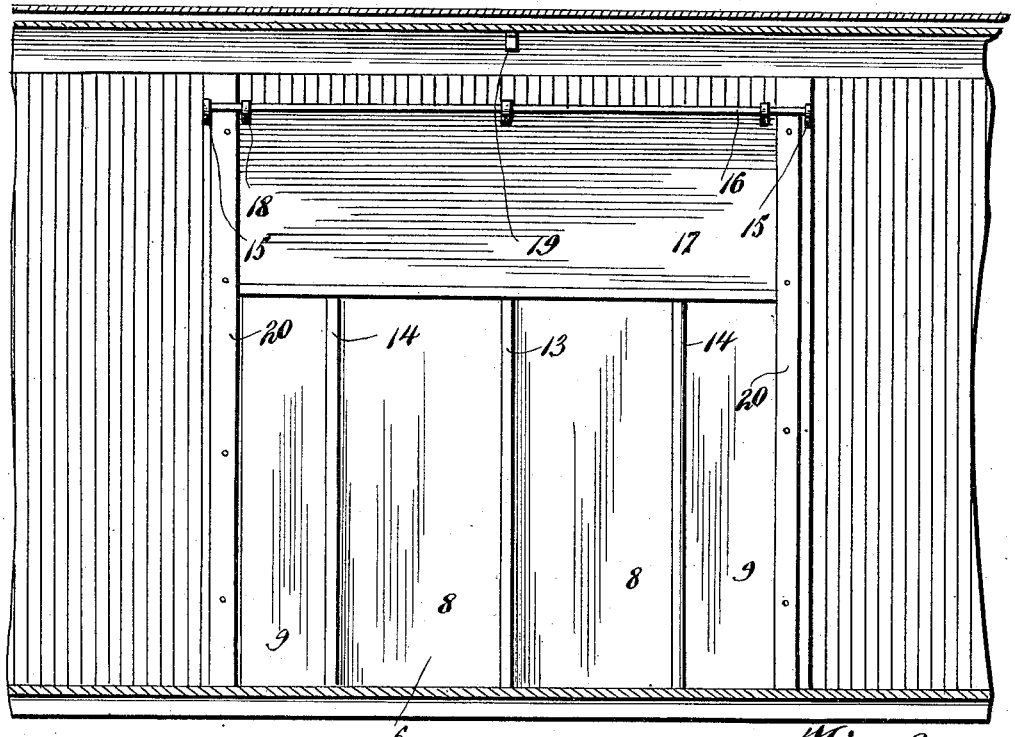
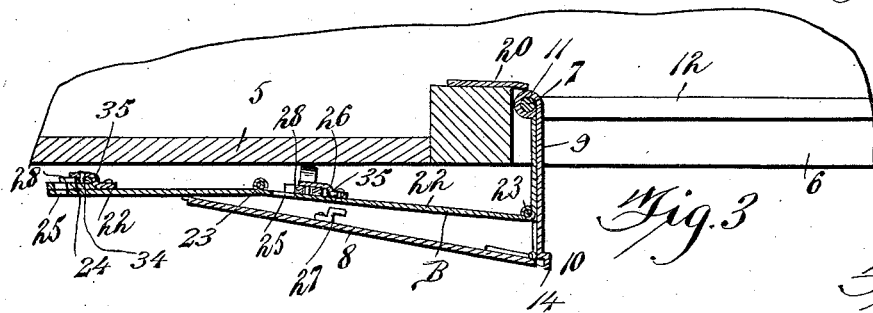
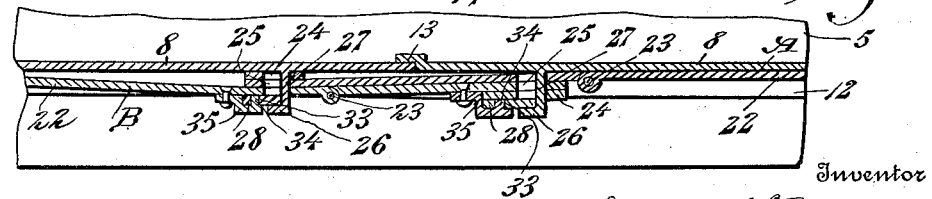

UNITED STATES PATENT OFFICE.

HENRY H. KING, OF GRESHAM, OREGON.

GRAIN-CAR DOOR.

1,062,476.   Specification of Letters Patent.   Patented May 20, 1913.

Application filed July 19, 1912. Serial No. 710,394.

*To all whom it may concern:*

Be it known that I, HENRY H. KING, a citizen of the United States, residing at Gresham, in the county of Multnomah and State of Oregon, have invented new and useful Improvements in Grain-Car Doors, of which the following is a specification.

The invention relates to car doors, and more particularly to the class of grain car doors.

The primary object of the invention is the provision of a door of this character wherein the doorway may be completely closed so as to avoid the possibility of the loss of grain during the transit of the car and also which will protect the grain from atmospheric changes so as to avoid deterioration of the grain when loaded within the car.

Another object of the invention is the provision of a door wherein the same is formed of vertically swinging upper sections and horizontally swinging and vertically slidable lower sections, the upper and lower sections being locked when in closed position in a unique and novel manner, and on the raising of the upper section the said lower sections may be vertically raised on the sliding thereof to permit the unloading of the grain from the car without the possibility of the excessive spilling thereof during the unloading operation.

A further object of the invention is the provision of a car door wherein the sections thereof will be materially braced for the reinforcing of the same to avoid the outward bulging of the door resulting from excessive weight of the grain against the same when the car is loaded therewith.

A still further object of the invention is the provision of a door of this character wherein the doorway in the body of the car is rendered waterproof.

A still further object of the invention is the provision of a car door in which the lower sections thereof can be readily folded for the opening of the same, whereby they will swing out of the way of the grain in unloading of the car.

A still further object of the invention is the provision of a car door which is simple in construction, strong, durable, reliable and efficient in its purpose, and inexpensive in manufacture.

With these and other objects in view the invention consists in the construction, combination and arrangement of parts as will be hereinafter more fully described, illustrated in the accompanying drawings, and pointed out in the claims hereunto appended.

Figure 1:
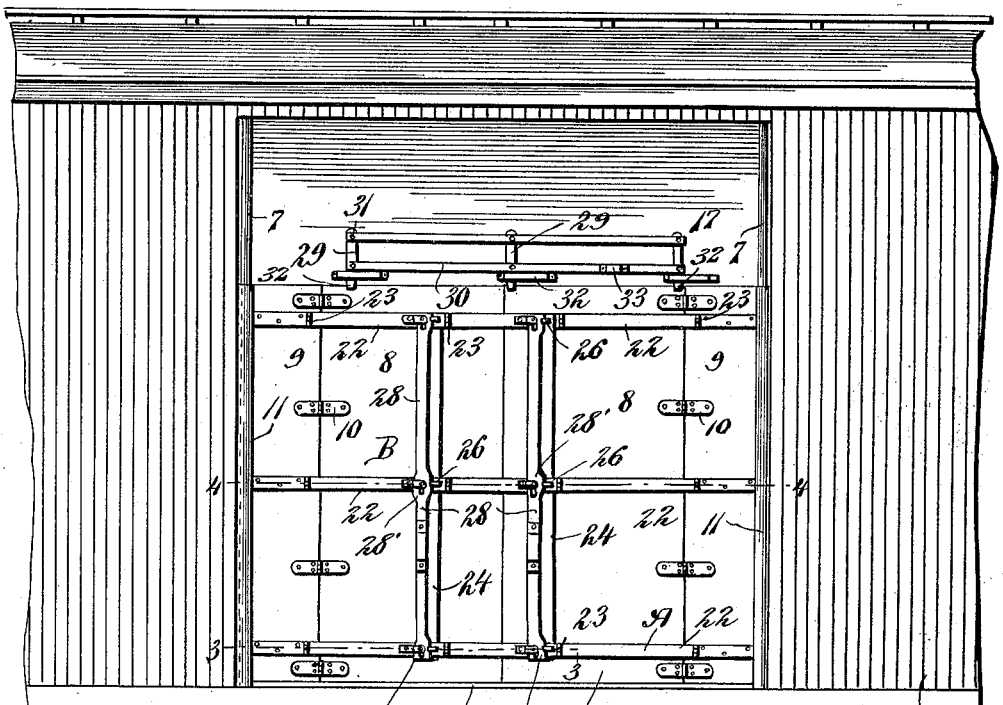
Figure 4:
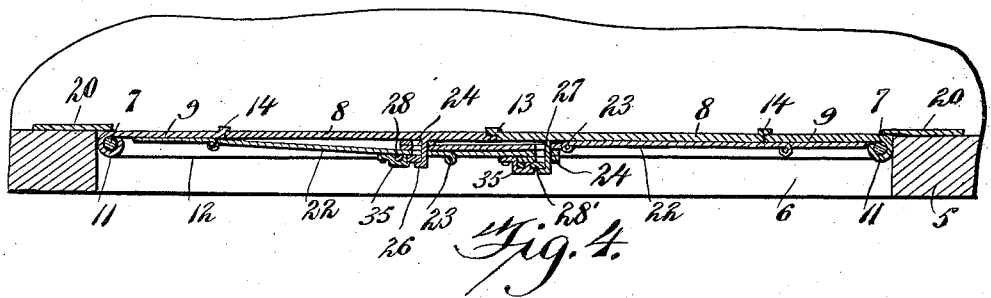

In the drawings:—Figure 1 is a fragmentary side elevation of a car showing the grain door constructed in accordance with the invention mounted therein. Fig. 2 is a vertical longitudinal sectional view through the car looking toward the inner side of the door. Fig. 3 is a sectional view on the line 3—3 of Fig. 1 showing the door open. Fig. 4 is a sectional view on the line 4—4 of Fig. 1, the door being closed. Fig. 5 is a fragmentary horizontal sectional view through the door when closed and fastened.

Similar reference characters indicate corresponding parts throughout the several views in the drawings.

Referring to the drawings by numerals, 5 designates a portion of the body of a car for the transportation of grain or other material, having in its side a doorway 6 of the ordinary well-known construction. Arranged contiguous to the vertical inner side edges of the doorway 6, are vertical guide rods 7, the ends of which are fastened within suitable sockets in the head and sill of the doorway. Adapted to close the lower portion of the doorway 6 are inner and outer swinging door sections 8 and 9 respectively, the sections 9 being connected to the sections 8 by means of strap hinges 10, which are fixed to the outer faces of the said sections, whereby the said inner sections 8 may swing horizontally outwardly of the doorway and against the side wall of the car. Formed at the outmost edges of the sections 9 are sleeves 11 which extend the entire length thereof and loosely embrace the guide rods 7 whereby the said sections 8 and 9 may rise or lower vertically and also the outer sections 8 may be swung horizontally in an outward direction through the doorway.

Secured to the base sill of the doorway 6 is a weather board or strip 12, against which abut the lower edges of the sections 8 and 9 when closed, one of the sections 8 on its inner side and at the free edge thereof being provided with a closure strip 13, which is designed to overlap the free edge of the other section 8 when the said sections are in position for closing the lower portion of the doorway. The sections 8 are further provided at their hinge edges and on the inner faces thereof with overlapping strips 14, which serve as closure strips for the hinge joint between the sections 8 and 9 and are adapted to overlap the portions of the sections 9 when the said sections are in position for closing a portion of the doorway.

Mounted in the side of the car at opposite sides of the doorway 6 at the head thereof are bearings 15 in which is engaged a horizontally disposed shaft 16 from which is hung a vertically swinging section 17 adapted to close the portion of the doorway 6 above the sections 8 and 9, the section 17 being connected to the shaft 16 by means of strap eye members 18 fixed to the section and loosely engaging the said shaft whereby the said section 17 may be swung downwardly and outwardly in closing position or inwardly and upwardly for the opening of the upper portion of the doorway 6, and when said section 17 is in the latter position it is engaged with a latch arm 19 suitably connected to the roof of the car.

Secured to the inner side of the side wall of the car 5 at the side edges of the doorway 6 therein are weather strips 20 which are adapted to frictionally engage the sleeves 11 of the outer sections 9 and thereby close the gap formed between the same and the edges adjacent thereto of the doorway. The section 17 when closed will contact with the weather strips 20 and in this manner the door when closed will be rendered weatherproof.

Mounted upon the outer sections 9 at the outer faces thereof are foldable strap frames A and B, each comprising intermediate and outer horizontal straps 22 provided with hinged joints 23 at intervals thereof, and a vertical end strap 24 which is fixed to the said intermediate and outer straps 22. The straps 22 and 24 are provided with keeper receiving openings 25 for receiving the hook-like ends 26 of stationary keepers 27 secured to the outer faces of the inner sections 8. The frame A is designed to overlap a portion of the frame B when the same have been engaged with the stationary keepers 27, and slidably mounted upon the said frame A are vertically slidable latch bars 28 adapted to engage the hook ends 26 of the said keepers 27, thereby locking the frames A and B and sections 8 and 9 together when the said sections are in position for closing the lower portion of the doorway in the car.

Mounted on the outer side of the section 17 are a plurality of pivot latch members 29 the same being spaced from each other and connected through the medium of an actuating bar 30 pivoted at 31 thereto, whereby the said latch members can be thrown in unison into locking engagement with the door sections 8 by vertically moving said members and thereby sustaining the section 17 closed. The latch members 29 work in guide loops 32 mounted upon the outer side of the section 17. The latch members 28 and actuating bar 30 carry loop handles 33 whereby they may be manually manipulated. The latch bars 28 are provided with slots 33 through which are passed guide pins 34 fixed in guide brackets 35 mounted upon the straps 22, the pins 34 being also fixed in the said straps 22 so as to vertically guide the latch bars for the positive engagement of the same with the keepers 27 or the disengagement of the said latch bars from the latter. It will be noted that at the ends and the medial portion of each vertically slidable bar 28 are laterally extending lips 28' which are adapted to slide under the free ends of the keepers 27 for locking engagement therewith, and when the latch bars 28 are moved a predetermined distance the lips 28' will slide from under the keepers 27 and in this manner disengage therefrom to permit the opening of the door.

From the foregoing description, taken in connection with the accompanying drawings, it is thought that the construction and operation of the invention will be clearly understood, and therefore, a more extended explanation has been omitted.

What is claimed is:—

1. The combination with a doorway, of a door comprising a plurality of sections adapted to swing horizontally, hinges connecting the swinging sections, guide rods mounted vertically within the doorway and slidably engaged by the horizontal swinging sections, reinforcing strap frames hinged to the outermost swinging sections and adapted to overlap each other, keepers carried by the innermost swinging sections and engageable with the said overlapped ends of the frames, and means on the frames and engageable with the keepers for locking the sections closed.

2. The combination with a doorway, of a door comprising a plurality of sections adapted to swing horizontally, hinges connecting the swinging sections, guide rods mounted vertically within the doorway and slidably engaged by the horizontal swinging sections, reinforcing strap frames hinged to the outermost swinging sections and adapted to overlap each other, keepers carried by the innermost swinging sections and engageable with the said overlapped ends of the frames, and means on the frames and engageable with the keepers for locking the sections closed, the said frames being formed of a plurality of hinged straps.

In testimony whereof I affix my signature in presence of two witnesses.

HENRY H. KING.

Witnesses:
 MAE D. KING,
 O. P. POTTS.